(12) United States Patent
Hehl et al.

(10) Patent No.: US 7,386,520 B2
(45) Date of Patent: Jun. 10, 2008

(54) COST-BASED METHOD FOR DYNAMICALLY PRICING AND PRIORITIZING AN E-MAIL

(75) Inventors: Walter Hehl, Thalwil (CH); Abderrahim Labbi, Zurich (CH); Mark Lutwyche, Mars, PA (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 10/646,377

(22) Filed: Aug. 22, 2003

(65) Prior Publication Data
US 2004/0098460 A1 May 20, 2004

(30) Foreign Application Priority Data
Aug. 22, 2002 (EP) .................................. 02368094

(51) Int. Cl.
*G06F 99/00* (2006.01)
(52) U.S. Cl. .............................. 705/400; 705/1; 705/14; 705/39; 709/206; 379/100.08
(58) Field of Classification Search ...................... 705/1, 705/40, 51, 400, 14; 709/206
See application file for complete search history.

(56) References Cited

U.S. PATENT DOCUMENTS

| | | | | |
|---|---|---|---|---|
| 5,771,289 | A * | 6/1998 | Kuzma | 713/153 |
| 6,047,272 | A * | 4/2000 | Biliris et al. | 705/400 |
| 6,243,450 | B1 * | 6/2001 | Jansen et al. | 379/144.01 |
| 6,292,211 | B1 * | 9/2001 | Pena | 348/14.08 |
| 6,374,292 | B1 * | 4/2002 | Srivastava et al. | 709/206 |
| 6,587,550 | B2 * | 7/2003 | Council et al. | 379/100.08 |
| 6,721,398 | B1 * | 4/2004 | Pitcher | 379/88.13 |
| 7,072,943 | B2 * | 7/2006 | Landesmann | 709/206 |

(Continued)

FOREIGN PATENT DOCUMENTS

JP         05268216        * 10/1993

(Continued)

OTHER PUBLICATIONS

"GotMarketing Sold on MetraTech; MetraTech Powers Dynamic Pricing and Billing for GotMarketing's E-mail Marketing Tools", Jul. 9, 2001, Business Wire. New York, p. 1.*

(Continued)

*Primary Examiner*—Thomas A. Dixon
*Assistant Examiner*—Freda A. Nelson
(74) *Attorney, Agent, or Firm*—Michael J. Buchenhorner; Eustus D. Nelson

(57) ABSTRACT

Method for dynamically allocating a cost to an e-mail that a first user of a transmission network such as the Internet network or an Intranet network who is a member of a group, wants to forward to a second user of the transmission network who is also a member of the group. The method comprising the steps of forwarding by the first user the e-mail to a market engine in charge of allocating a cost to the e-mail, determining by the market engine the cost of the e-mail based upon intrinsic and extrinsic criteria, submitting the cost of the e-mail to the first user for agreement, forwarding by the market engine the e-mail to the second user, and updating a credit account associated with the first user.

14 Claims, 2 Drawing Sheets

U.S. PATENT DOCUMENTS

| | | | |
|---|---|---|---|
| 2002/0107697 A1* | 8/2002 | Jensen | 705/1 |
| 2002/0120600 A1* | 8/2002 | Schiavone et al. | 707/1 |
| 2003/0074255 A1* | 4/2003 | Tanigawa | 705/14 |
| 2003/0105712 A1* | 6/2003 | Bodensohn | 705/40 |
| 2003/0144903 A1* | 7/2003 | Brechner et al. | 705/14 |
| 2006/0023665 A1* | 2/2006 | Zellner et al. | 370/329 |
| 2006/0041505 A1* | 2/2006 | Enyart | 705/40 |

FOREIGN PATENT DOCUMENTS

JP    11177606 A  *  7/1999

OTHER PUBLICATIONS

"INSTIL: Instil propels dynamic pricing, exchange and procurement technology to a new level", Jul. 10, 2000, M2 Presswire, p. 1.*

"GotMarketing Sold on MetraTech; MetraTech Powers Dynamic pricing and Billing for GotMarketing's E-mail Marketing Tools"; Jul. 9, 2001, Business Wire. New York, p. 1.*

"INSTIL: Instil propels dynamic pricing, exchange and procurement technology to a new level", M2 Presswire, p. 1.*

* cited by examiner

COST-BASED METHOD FOR DYNAMICALLY PRICING AND PRIORITIZING AN E-MAIL

TECHNICAL FIELD

The present invention relates to the management of the e-mails which are transmitted between a plurality of people belonging to a same corporation such as the employees of an industrial company and relates in particular to a cost-based method for dynamically pricing and prioritizing an e-mail.

BACKGROUND

Effective management and processing of e-mails has been a central concern for companies and Internet Service Providers (ISPs) for many years. Several solutions have been developed to deal with unsolicited e-mails, or spam. Most of these solutions use some algorithms, or some hand-crafted rules, for e-mail profiling and filtering but they are just partially effective and it is, usually easy to fake them (PCWorld, 2000). Most of these systems are intended to alleviate e-mail overload in open network environments, such as the Internet.

However, in corporate networks, e-mail overload does not come generally from spam, or junk mail, but more from irrelevant and unimportant business e-mail exchange between employees. Many employees in big corporations are overloaded by daily avalanches of internal e-mails from colleagues. This happens mostly to employees in middle management of large corporations who receive large amounts of unimportant e-mails from upper and lower corporate units.

There are some systems which are used for managing email and avoiding each user from receiving a large amount of trivial or irrelevant e-mail. The existing systems can be classified in three classes:

e-mail Filtering

The filtering systems are the most widely used for sorting important e-mails from unsolicited or junk mail (spam). There are spam filters which operate at the server and at the client level. They usually use some rule-based mechanisms to recognize junk mail and delete it, or reroute it to a specific folder for further processing. The filtering rules usually use either lists of unwanted mailing sources or apply some spam pattern detection technique to recognize massive flow of incoming e-mails with some specific pattern. These rules can be derived through automatic analysis of e-mail streams or manually whenever a mail system administrator notices a large attack in the mail system in which they see a lot of illicit mail or spam going to a lot of people all from one place.

Despite the wide deployment of spam filters by e-mail service providers, they can filter out only a fraction of the junk they are supposed to, according to a benchmark study (PCWorld, 2000). Further development of better filters which incorporate more intelligent technology is of primary importance. Such importance is dictated by the increasing cost of processing larger and larger amounts of e-mail, and by users overload with unsolicited mail.

e-mail Categorization

There are two main types of systems which offer such functionality which consists in automatic routing of e-mail at a server or at a client (user) level. Systems with predefined categories and systems which discover the categories through a categorization process which uses some clustering algorithm. In the case of predefined categories, the user specifies the categories (or classes) he/she wants to partition the mail box into, and then gives the system a few typical e-mail examples which represent each category (or class). These typical examples are used for system training using some machine learning algorithm which allows inferring decision rules for automatic classification of future incoming e-mails. In the second type of systems, the number and content of the categories are automatically discovered from the set of e-mails of a user's mail box. These systems define some similarity measure between documents (e-mails) and then group similar documents into clusters which are further refined either through merging several clusters or through splitting too general ones.

Both types of systems usually use various text mining technologies for document representation (usually a vector space), similarity measure (metrics) and category learning from examples using supervised or unsupervised machine learning algorithms.

Such systems can prove efficient for handling e-mail flows, for instance by defining specific categories of mails which are urgent, or topic-related, or group-related, etc. Although they might help to prioritize e-mail processing, they do not eliminate the overhead due to unimportant or irrelevant e-mail as they do not provide any measure of real importance to the user.

e-mail Size Limitation

The systems with such functionality allowed management of e-mails either based on the size of incoming and/or outgoing messages, or based on a predefined limit size of the user's mail box. Some systems allow to either block incoming or outgoing e-mails above some threshold size, or reschedule their routing to subsequent time to optimize bandwidth cost.

Although the approaches presented above can alleviate problems related to large size, junk, or spam mail in an open network environment, they are of little use in corporate networks where most of the e-mail overload comes from unimportant and irrelevant mail exchange between employees. What is needed in corporate networks are mechanisms which regulate e-mail exchange in a way similar to mechanisms for trading items in a marketplace.

SUMMARY OF THE INVENTION

Accordingly, an embodiment of the invention is a method of assigning a cost to an e-mail in a way which reflects the cost of transmitting and processing the e-mail, such a cost being determined by the infrastructure constraints and the user preferences.

The invention relates therefore to a method for dynamically allocating a cost to an e-mail that a first user of a transmission network such as the Internet network or an Intranet network who is a member of a group, wants to forward to a second user of the transmission network who is also a member of the group, comprising the steps of:

forwarding by the first user the e-mail to a market engine in charge of allocating a cost to the e-mail, determining by the market engine the cost of the e-mail based upon intrinsic and extrinsic criteria, submitting the cost of the e-mail to the first user for agreement, forwarding by the market engine the e-mail to the second user, and updating a credit account associated with the first user.

According to an important feature of the invention, the market engine is a central market engine including a user credit database which contains the credit accounts of all users and which is accessed by the central market engine when this one has to determine the cost of the e-mail. The credit account of each user is also maintained in a credit database at the client device associated with the user.

According to another important feature of the invention, the credit account included in the credit database of the central market engine and the credit database at the client device associated with each user are initialized by providing for the user a number of credit points at some specific periods, for example every month.

BRIEF DESCRIPTION OF THE DRAWINGS

The above and other objects, features and advantages of the invention will be better understood by reading the following more particular description of the invention in conjunction with the accompanying drawings.

DETAILED DESCRIPTION OF THE INVENTION

The following description applies to the management of the e-mails exchanged between the employees of a large company, but could be applied in any large group or corporation where a data transmission network such as the Internet network or an Intranet network is used by the people of the group to exchange a large amount of e-mails.

Figure 1:
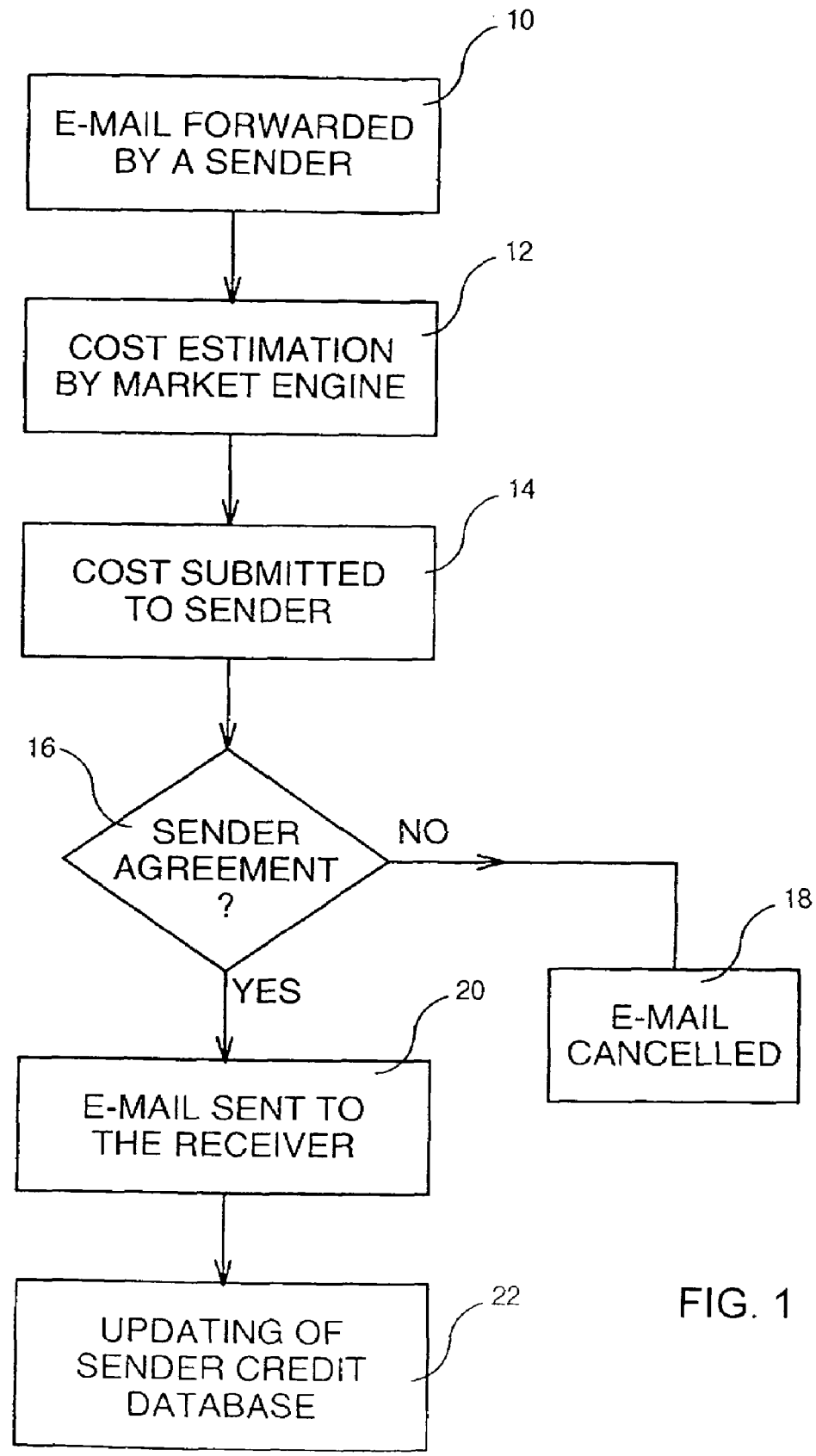
FIG. 1 is a flow chart of the different steps of the method according to the invention after an e-mail has been sent by a sender.

In reference to FIG. 1 representing the flow chart of the method, the first step is the forwarding of an e-mail or more precisely a request for sending an e-mail by a sender to a receiver (step 10). This request contains the target address or may contain the preferred or expected target device or any other preference settings such as delivery schedule, format, etc.

The request for an e-mail is submitted to a market engine which may be a local market engine when running at the client device associated with each user or a central market engine when running as a server. The market engine estimates the cost of the e-mail by using some criteria as described below (step 12). Then, the cost estimation is submitted to the sender (step 14) together with side information which might be the explanation of the status of the receiver (e.g. not receiving e-mails at some time).

Then, the sender has to agree or not with the estimated cost (step 16). If the sender thinks that the submitted cost is too high, he decides not to transmit the e-mail which is canceled (step 18). If he accepts the cost, the e-mail is forwarded to the receiver by the market engine (step 20).

At the client device associated with each user of the system or, in the example, each employee of the corporation, there is a credit database accessed on line by the market engine. When a central market engine is used, this one has at its disposal a user credit database which contains the credit information for all the users of the system. After sending the e-mail, the market engine updates the central credit database and/or the specific user database by decreasing a credit account which is associated with the user who sent the e-mail (step 22). Note that the initialization of the sender's account or credit is set such that each user is given at some specific time periods, for example every month, a number of credit points which serve as currency for the e-mail cost payment.

Beside the credit account associated with each user of the system, the credit database contains rules and guidelines regarding the e-mail. Upon receiving a request for sending an e-mail, the market engine uses criteria which are both intrinsic and extrinsic to set up the cost of the e-mail for four parameters as follows:

1. Position of Each User in the Hierarchy

The intrinsic criteria are defined by a matrix H where each element $H(i,j)$ is a cost factor for user i sending an e-mail to user j. $H(i,j)$ can be computed as some monotonic function of $p(i)/p(j)$ where $p(i)$ is determined by the rank of user i with respect to user j and reciprocally $p(j)$ is determined by the rank of user j with respect to user i.

These intrinsic criteria depending on the hierarchy can be adapted by the users depending on their preferences by adjusting the cost factors with extrinsic factors $\alpha(i,j)$ defined in a matrix such as the following where $e_1, e_2 \ldots e_n$, are the n users of the system.

$$A(a_{I,J}) = \begin{pmatrix} & \begin{pmatrix} e_1 & e_2 & e_3 & e_4 & \ldots & e_n \end{pmatrix} \\ e_1 \\ e_2 \\ e_3 \\ e_4 \\ \vdots \\ e_n \end{pmatrix} \begin{pmatrix} 0 & a_{21} & a_{31} & a_{41} & \ldots & a_{n1} \\ a_{12} & 0 & a_{32} & a_{42} & \ldots & \vdots \\ a_{13} & a_{23} & 0 & a_{43} & \ldots & \vdots \\ a_{14} & a_{24} & a_{34} & 0 & \ldots & \vdots \\ \vdots & \vdots & \vdots & \vdots & \ldots & \vdots \\ a_{1n} & \ldots & \ldots & \ldots & \ldots & 0 \end{pmatrix}$$

For example, some user at some high level management may decide that e-mails from users from lower level hierarchy would cost less ($\alpha < 1$) or more ($\alpha > 1$) than the general cost.

2. Size of e-mail

Insofar as it is generally not wanted to send e-mails having a very large size, the cost of an e-mail is, as a general rule, a direct function of the e-mail size S. However, it can be judicious to define also a matrix wherein each element $S(i,j)$ determines the cost factor depending on the size of the e-mail sent from user i to user j.

Here also, the basic cost value S or $S(i,j)$ can be adjusted by the users through extrinsic factors $\beta(i,j)$ defined in a matrix similar to the matrix $\alpha(i,j)$ where user j, that is the receiver, can increase ($\beta > 1$) or decrease ($\beta < 1$) the e-mail size cost for user i. The market engine is notified with the extrinsic factor by the receiver.

3. Subject of e-mail

The intrinsic criteria are defined by a matrix T where each element $T(i,j)$ is the initial cost factor of sending an e-mail from user i to user j on some subject. The values of the factors $T(i,j)$ are determined by the corporate guidelines.

The intrinsic cost factors can later be adapted by the user depending on their specific preferences defined by extrinsic factors $\gamma(i,j)$. For example, a receiver j can decide that he accepts e-mails from a sender i about some set of subjects for lower cost ($\gamma < 1$), maybe with priorities, and charges higher cost to a sender i($\gamma > 1$) about some subject which is blacklisted, undesired, irrelevant, provocative, etc. In this case, the sender, notifies the market engine which maintains the list of subjects and the matrices T and $\gamma(i,j)$ for each subject. Note that an extrinsic factor $\gamma(i,j)$ could be close to 0 if the e-mail is very urgent.

4. Device Type

The device type results in a matrix D where each element D(i,j) is the intrinsic cost factor of sending an e-mail from a user i to a user j on some device. The values of the cost factors D(i,j) are set up through the corporate guidelines.

As above, the intrinsic factors can later be adapted by the receiver depending on the mutual agreements with the sender as expressed by extrinsic factors δ(i,j) similarly to the other extrinsic cost factors.

Therefore, the overall cost of an e-mail $E_{ij}$ from user i to user j is mathematically summarized by the following equation:

$$C(E_{ij}) = \alpha(i,j) \cdot H(i,j) + \beta(i,j) \cdot S(i,j) + \gamma(i,j) \cdot T(i,j) + \delta(i,j) \cdot D(i,j)$$

It must be noted that each of extrinsic cost factors $\alpha, \beta, \gamma, \delta$ can also be dynamically modified by the system administrator based upon system information such as messages on network overloads or buffer overflows (malus) or special actions such as a company discussion forum (bonus).

Another class of input might be time dependent user data, be it data set in advance as, for example, a holiday at the receiver's location or genuine real-time data fed back from the receiver.

Figure 2:
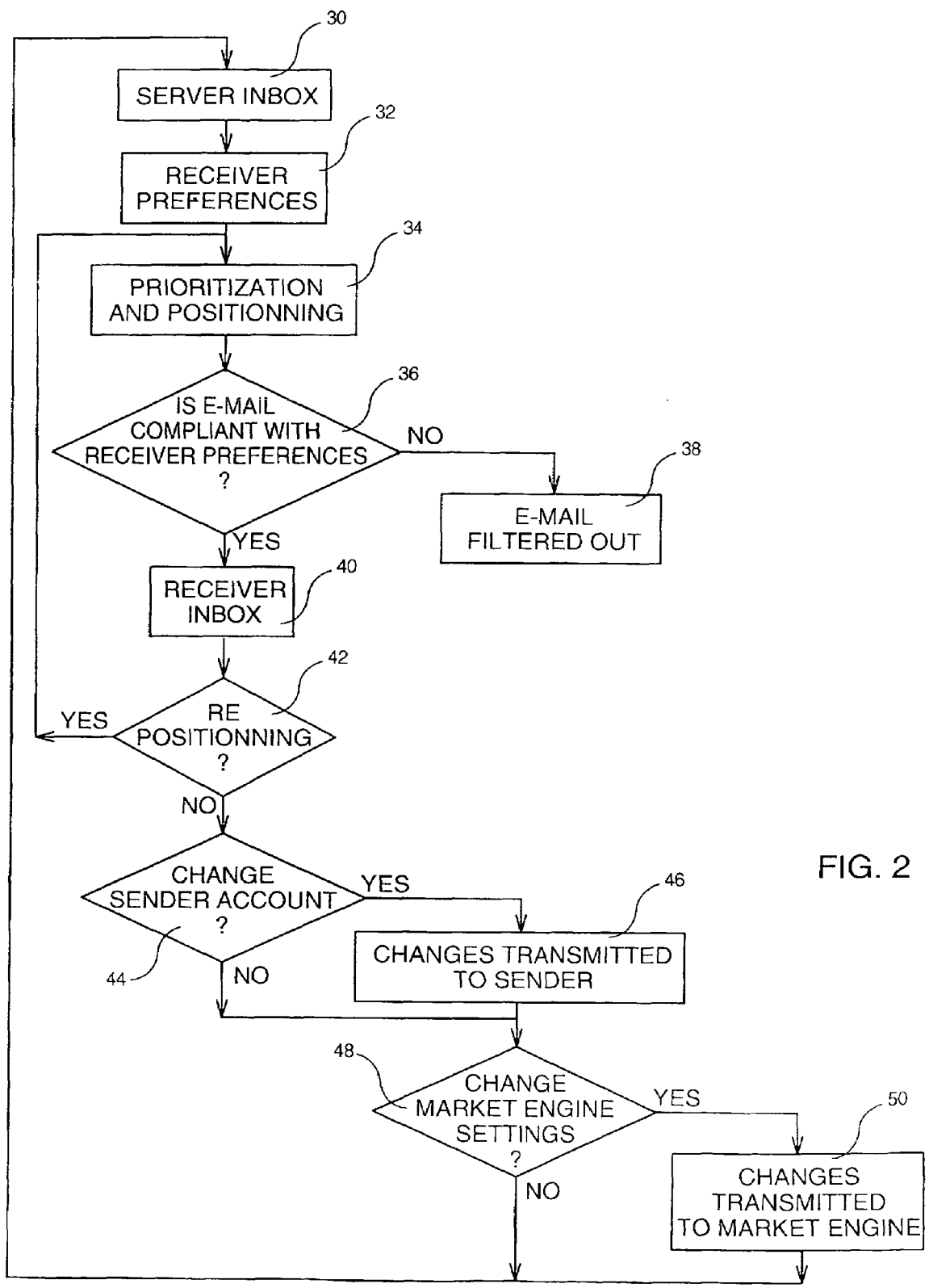
FIG. 2 is a flow chart representing the different steps of the method according to the invention on the receiver side.

On receiver side, the steps of the method according to the invention are illustrated in FIG. 2. When an e-mail arrives at the server inbox (step 30) asking for access to a receiver or group of receivers, the receiver preferences are checked (step 32). The prioritization and positioning of the e-mail are triggered using the receiver preferences (step 34) in order to check whether the e-mail is compliant with the receiver preferences (step 36). If it is not the case, the e-mail is filtered out to be canceled or delivered later (step 38).

If the e-mail complies with the receiver preferences, it is placed in the input queue of e-mails in the receiver inbox (step 40). At this stage, the receiver can further reposition and re-prioritize the e-mail (step 42). If so, the method is looped back to the step of positioning and prioritizing (step 34). Often, the e-mail is repositioned to a less expensive medium such as voice mail, but sometimes to a more expensive medium such as a large screen of a conference room. Of course, a limiting mode of operation will be the rejection of the e-mail.

When reading the e-mail in the resulting priority and on the resulting device, there may be a feedback to the sender for determining whether there is a change of the sender account (step 44). For example, such a change could be a bonus granted through a click of the receiver on a "was good information" button. The changes are thus transmitted to the sender (step 46). In both cases, it is checked whether it is necessary to change the market engine settings (step 48) for the relationship (i,j). Such changes, for example an overload condition, are transmitted to the market engine by the receiver (step 50). Note that the receiver can set up at any time temporary or permanent changes to his preferences. Such changes could be related to the type of device preferred, the identity of the sender or the nature of the content (e.g. accept e-mails only/not on the same subject), or the context such as during some executive-level meeting. Such preference settings are transmitted to the market engine which keeps up-to-date information about status and preferences of each user.

The invention claimed is:

1. A method for dynamically allocating a cost to an e-mail, the method comprising steps of:

forwarding by a first user, who is a member of an email group, said e-mail to a market engine for allocating a cost to said e-mail;

determining by said market engine the cost of said e-mail based upon intrinsic and extrinsic criteria, wherein the intrinsic and extrinsic criteria are defined by taking into consideration four parameters: positions of said first user and second users in a hierarchy of the email group; size of said email; subject of said email; subject of said email and device type for mail delivery; and wherein said extrinsic criteria is used for adjusting said intrinsic criteria for each parameter;

submitting the cost of said e-mail to said first user for agreement by said first user;

forwarding by said market engine said e-mail to the second user in response to said agreement by the first user, wherein said second user is a member of the email group;

updating a credit account associated with said first user;

running said market engine as a central market engine including a user credit database which contains the credit accounts of all users and which is accessed by said central market engine when said market engine has to determine the cost of said e-mail; and maintaining the credit account of each user in a credit database at a client device associated with said user, wherein said step of maintaining said credit account included in the credit database of said central market engine and the credit database at the client device associated with each user further includes the step of providing for said user a number of credit points at some specific periods.

2. The method according to claim 1, further comprising the step of running said market engine as a local market engine when running at a client device associated with each user.

3. The method according to claim 1, further comprising the step of defining said extrinsic criteria for said respective positions of said first and second users in the hierarchy by a matrix wherein a value of each element α(i,j) associated with a sender i and a receiver j determined by the decision of a high level manager of said group.

4. The method according to claim 1, further comprising the step of defining said extrinsic criteria for the size of said e-mail by a matrix wherein a value of each element β(i,j) associated with a sender i and a receiver j is determined by said receiver j.

5. The method according to claim 1, further comprising the step of defining said intrinsic criteria for the subject of said e-mail by a matrix$^T$ wherein a value of each element T(i,j) associated with a sender i and a receiver j is determined by a set of guidelines of said group.

6. The method according to claim 5, further comprising the step of defining said extrinsic criteria for the subject of said e-mail by a matrix wherein a value of each element .gamma. (i,j) associated with sender i and receiver j for adjusting the value of the corresponding element T(i,j) of said matrix$^T$ is determined by said receiver j.

7. The method according to claim 1, further comprising the step of defining said intrinsic criteria for the device type by a matrix$^D$ wherein a value of each element D(i,j) associated with a sender i and a receiver j is determined by a set of guidelines of said group.

8. The method according to claim 1, further comprising the step of dynamically determining each of said extrinsic criteria by the administrator of the system based upon system information.

9. The method according to claim 1, further comprising the step of reprioritizing and repositioning said e-mail by said second user when it is received from said market engine.

10. The method according to claim 1, further comprising the step of providing said group as a large company and said users as employees of said company.

11. The method according to claim 1, further comprising the step of providing said market engine as a central market engine when running as a server.

12. The method according to claim 1, further comprising the step of dynamically determining each of said extrinsic criteria by the administrator of the system based upon system information.

13. The method according to claim 1, further comprising the step of dynamically determining each of said extrinsic criteria by the administrator of the system based upon system information comprising messages on special actions.

14. An article of manufacture for dynamically allocating a cost to an e-mail transmission within a transmission network, wherein a first user, who is a member of an e-mail group, forwards the email to a second user who is a member of the e-mail group; the article comprising a machine readable medium tangibly embodying a program of instructions executable by a machine for implementing a method, the method comprising steps of:

forwarding by said first user said e-mail to a market engine in charge of allocating the cost to said e-mail;

determining by said market engine the cost of said e-mail based upon intrinsic and extrinsic criteria wherein said intrinsic and extrinsic criteria are defined by taking into consideration four parameters: positions of the first user and the second user in a hierarchy of the e-mail group; size of said e-mail; subject of said e-mail; subject of said e-mail and device type for mail delivery; and wherein said extrinsic criteria is used for adjusting said intrinsic criteria for each parameter;

submitting the cost of said e-mail to said first user for agreement;

forwarding by said market engine said e-mail to said second user in response to the agreement by the first user;

updating a credit account associated with said first user;

running said market engine as a central market engine including a user credit database which contains the credit accounts of all users and which is accessed by said central market engine when said market engine has to determine the cost of said e-mail; and maintaining the credit account of each user in a credit database at a client device associated with said user, wherein said step of maintaining said credit account included in the credit database of said central market engine and the credit database at the client device associated with each user further includes the step of providing for said user a number of credit points at some specific periods.

* * * * *